(12) United States Patent
Matsumoto et al.

(10) Patent No.: US 9,051,966 B2
(45) Date of Patent: Jun. 9, 2015

(54) LINEAR GUIDE APPARATUS

(75) Inventors: Jun Matsumoto, Maebashi (JP); Ryoichi Sato, Maebashi (JP); Masaru Hattori, Hanyu (JP)

(73) Assignee: NSK Ltd., Tokyo (JP)

( * ) Notice: Subject to any disclaimer, the term of this patent is extended or adjusted under 35 U.S.C. 154(b) by 204 days.

(21) Appl. No.: 13/818,505

(22) PCT Filed: Jul. 25, 2011

(86) PCT No.: PCT/JP2011/004188
§ 371 (c)(1),
(2), (4) Date: Apr. 9, 2013

(87) PCT Pub. No.: WO2012/029232
PCT Pub. Date: Mar. 8, 2012

(65) Prior Publication Data
US 2013/0195386 A1    Aug. 1, 2013

(30) Foreign Application Priority Data
Sep. 1, 2010 (JP) .................................. 2010-196107

(51) Int. Cl.
*F16C 33/66* (2006.01)
*F16C 29/04* (2006.01)
*F16C 29/08* (2006.01)
(Continued)

(52) U.S. Cl.
CPC ............... *F16C 29/04* (2013.01); *F16C 29/086* (2013.01); *F16C 33/6648* (2013.01); *F16C 33/66* (2013.01); *F16C 33/76* (2013.01); *F16C 29/0642* (2013.01)

(58) Field of Classification Search
USPC ................................. 384/13, 15, 43–45; 184/5
See application file for complete search history.

(56) References Cited

U.S. PATENT DOCUMENTS

| 5,634,722 A | 6/1997 | Yuasa et al. |
| 8,403,562 B2 * | 3/2013 | Geka et al. ..................... 384/15 |
| 2009/0245701 A1 * | 10/2009 | Ogura et al. ..................... 384/15 |

FOREIGN PATENT DOCUMENTS

| CN | 1892058 A | 1/2007 |
| JP | 9-42284 A | 2/1997 |
| JP | 2004-28345 A | 1/2004 |

(Continued)

OTHER PUBLICATIONS

International Preliminary Report on Patentability (PCT/IB/338 & PCT/IB/373) dated Mar. 14, 2013 (two pages).
English translation of document C2 (Written Opinion (PCT/ISA/237) previously filed on Feb. 22, 2013 (four pages).

(Continued)

*Primary Examiner* — Thomas Diaz
(74) *Attorney, Agent, or Firm* — Crowell & Moring LLP

(57) ABSTRACT

A linear guide apparatus maintaining a high dust-proof performance over an extended period of time and includes side seal units attached to end parts of a slider in the axial direction. Each side seal unit is provided with: a first seal member, at the slider, arranged in the axial direction of the slider; a second seal member at the outside of the slider in the axial direction; and a lubricating member held between the first and second seal members. The first seal member has first lip parts sliding against the rolling element rolling grooves of the guide rail, while the second seal member has second lip parts sliding against the rolling element rolling grooves. The lubricating member has a first oil-containing member for supplying lubricant to the rolling element rolling grooves. The first and second lip parts are arranged not to come into contact with the first oil-containing member.

8 Claims, 10 Drawing Sheets

(51) Int. Cl.
 *F16C 33/76* (2006.01)
 *F16C 29/06* (2006.01)

(56) References Cited

FOREIGN PATENT DOCUMENTS

| | | |
|---|---|---|
| JP | 2004-316762 A | 11/2004 |
| JP | 2005-337407 A | 12/2005 |
| JP | 2007-285479 A | 11/2007 |

OTHER PUBLICATIONS

Chinese Office Action dated Mar. 27, 2014 including English translation (eleven pages).
International Search Report dated Oct. 11, 2011 including English-language translation (Two pages).
Japanese-language Written Opinion (PCT/ISA/237) dated Oct. 11, 2011 (Three pages).
Chinese Office Action Oct. 20, 2014, including English translation (twelve pages).

* cited by examiner

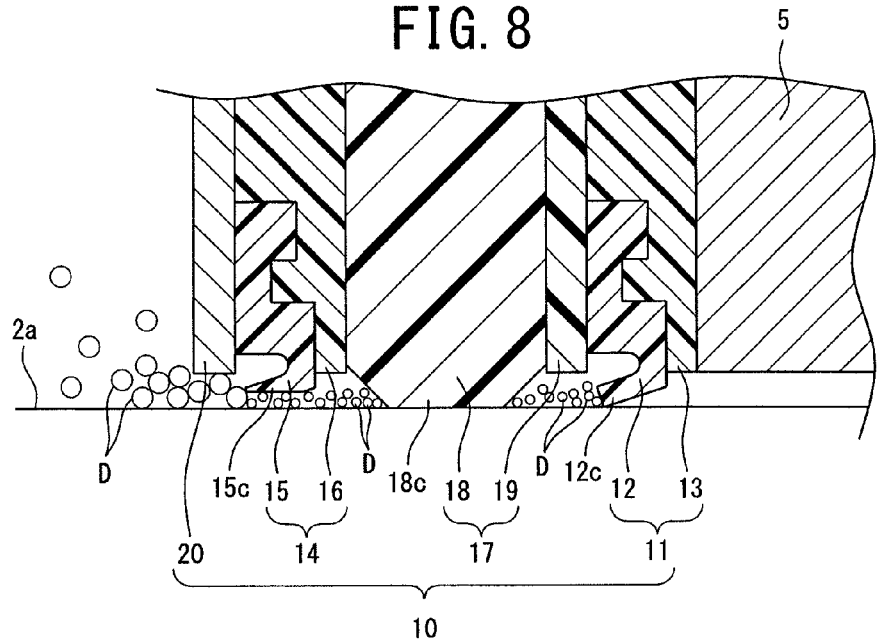
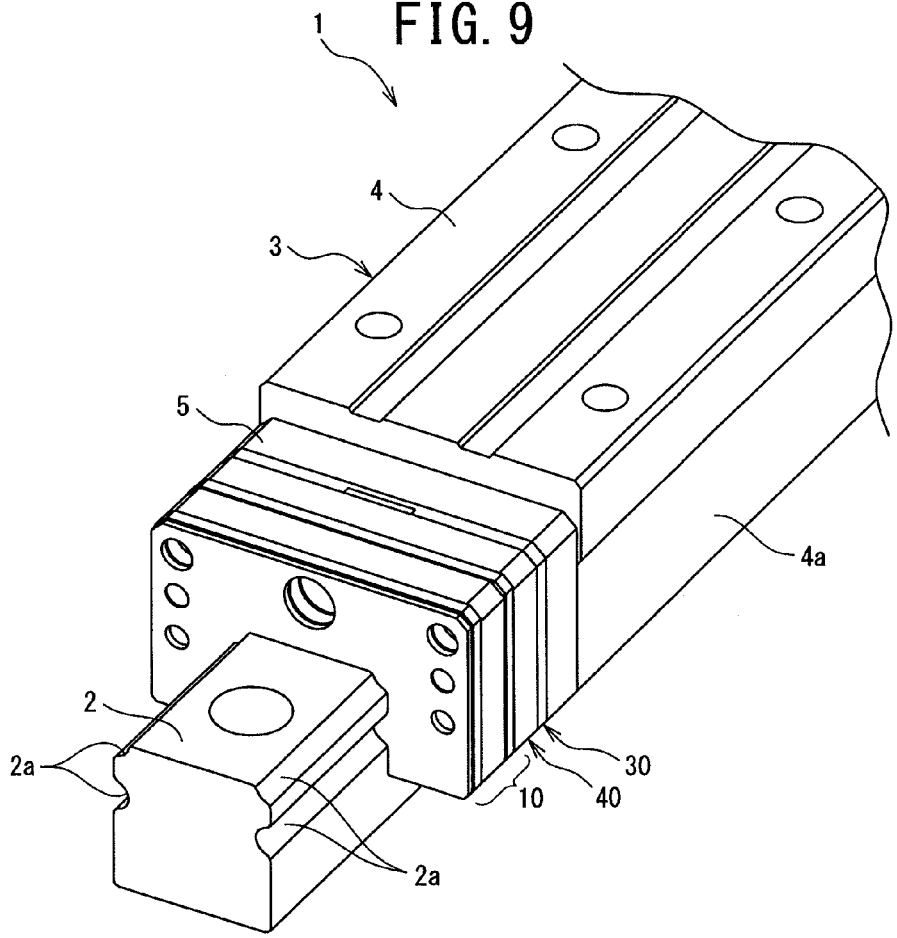

LINEAR GUIDE APPARATUS

TECHNICAL FIELD

The present invention relates to a linear guide bearing apparatus (linear guide apparatus) suitable for use in, for example, a machine apparatus like a machine tool where cutting dust or other foreign matter is produced in the surroundings.

BACKGROUND ART

As a conventional general linear guide apparatus, for example, the one shown in FIG. 14 is known.

The linear guide apparatus shown in FIG. 14 is provided with a guide rail 101 which extends in the axial direction and a slider 102 which straddles the guide rail 101 capable of moving relatively in the axial direction.

The two side surfaces of the guide rail 101 are formed with rolling element rolling grooves 103 which extend in the axial direction. The slider body 102A of the slider 102 is formed at the inner surfaces of two sleeve parts 104 with rolling element rolling grooves 107 which face the rolling element rolling grooves 103. Further, between each two facing rolling element rolling grooves 103 and 107, as one example of the rolling elements, a large number of balls B are rollably loaded. Through rolling of these balls B, the slider 102 can move on and relative to the guide rail 101 in the axial direction.

Along with this movement, the balls B interposed between the guide rail 101 and the slider 102 roll and move to the end parts of the slider 102. However, in order to continuously make the slider 102 move in the axial direction, these balls B have to be endlessly circulated.

For this reason, the sleeve parts 104 of the slider body 102A are formed therein with rolling element passages 108 which run through the axial direction, and both ends of the slider body 102A are secured with substantially U-shaped end caps 105 through for example screws 112 or other securing means. This end caps 105 are formed with direction changing channels 106 bent in semi-circular shapes connecting the two rolling element rolling grooves 103 and 107 and the rolling element passages 108, whereby rolling element endless circulation raceways are formed. Note that, in FIG. 14, reference numeral 111 indicates side seal members (rubber seal members) secured together with the end caps 105 to the end faces of the slider body 102A via screws 112 etc., reference numeral 110 indicates a tap hole for a screw 112 formed at an end face of the slider body 102A, reference numeral 113 indicates a greasing nipple, and reference numeral 114 indicates a bolt hole for securing the guide rail 101.

The side seals 111 are each made in substantially U-shape in the same way as the end caps 105, their inner circumferences are made seal surfaces which slide against the guide rail 101, and the seals are formed by steel sheets on which rubber is baked.

In this regard, in a linear guide apparatus used for a machine apparatus like a machine tool in which cutting dust and other foreign matter is generated, the seal by the above-mentioned side seal members 111 is not sufficient and the lubrication conditions become severer.

For this reason, the linear guide apparatus shown in FIG. 15 for preventing the entry of foreign matter to the inside of the slider and thereby prevents early wear or breakage (see Patent Document 1), has been proposed.

In the linear guide apparatus shown in FIG. 15, the end parts of the slider 102 (actually, the end caps 105) in the axial direction are provided with lubricant feed members 115. At the outer surface sides of the lubricant feed members 115, pluralities of seal members arranged and overlaid in the axial direction of the slider 102 are attached. The pluralities of seal members are interposed between hard seal members 117 arranged at the outer most sides in the axial direction of the slider 102 and the lubricant feed members 115. The pluralities of seal members are provided with soft seal members 121, 111, and 120, each having hardness lower than that of the hard seal members 117, and having mutually different seal performances.

Further, as a lubricating device of a guide apparatus for supplying the minimum extent of lubricating oil to the sliding surfaces of a guide member and moving member of a linear guide apparatus in proportion to the relative movement between the guide member and the moving member, for example, the one shown in FIG. 16 is known (see Patent Document 2).

The linear guide apparatus shown in FIG. 16 is provided with a guide rail (guide member) 201 and a moving member 202 slidably attached to the guide rail 201 and moves along the guide rail 201. The guide rail 201 has rolling grooves 205 which extend in the axial direction at the two side parts of the top surface and the top parts of the two side surfaces. The moving member 202 is provided with a body 203 and end caps 204 secured to the two end parts of the body 203. The body 203 is formed with grooves 206 constituting load raceways and grooves 207 which form return raceways, while the end caps 204 are formed with raceways 208 which connect the grooves 206 and the grooves 207. When the body 203 and the end caps 204 are connected, the moving member 202 is formed with four endless raceways. Each endless raceway is provided with a large number of balls 209 which form an aligned state.

Further, one end cap 204 is provided with a lubricating device 210 for supplying lubricating oil to the sliding surfaces 215 of the rolling grooves 205 of the guide rail 201 and of the balls 209 of the moving member 202.

The lubricating device 210 has: a case 211 secured to the end cap 204 so that its open end comes closer to a sliding surface 215 of the guide rail 201; a flexible sliding member 212 supported in the case 211 so that one end slides against the sliding surface 215 and segmenting the inside of the case 211 into two chambers; a lubricating oil storing member 213 arranged at a position of being pressed by the flexible sliding member 212 in the case 211 for supplying the lubricating oil to the sliding surface 215; and a seal piece 206 secured to the wall surface of the chamber in which the lubricating oil storing member 213 in the case 211 is arranged so that one end slides against the sliding surface 215.

Further, if the moving member 202 moves in the arrow A direction in FIG. 16, the flexible sliding member 212 of the lubricating device 210 slides over the sliding surface 215 and deforms in a direction coming closer to the lubricating oil storing member 213. If the flexible sliding member 212 deforms, the flexible sliding member 212 pushes against the lubricating oil storing member 213 and the lubricating oil stored in the lubricating oil storing member 213 is supplied to the sliding surface 215 in only an amount of the minimum extent proportional to the amount of motion of the moving member 202.

Next, when the moving member 202 reaches the end position of the guide rail 201, and the moving member 202 turns around and moves in the arrow B direction in FIG. 16, the flexible sliding member 212 deforms in a direction separating apart from the lubricating oil storing member 213, a clearance is formed between the flexible sliding member 212 and the lubricating oil storing member 213. Accordingly, an amount of lubricating oil corresponding to the amount supplied by the lubricating oil storing member 213 is refilled to the lubricating oil storing member 213.

PRIOR ART DOCUMENTS

Patent Documents

Patent Document 1: JP 2005-337407 A
Patent Document 2: JP 2004-28345 A

SUMMARY OF THE INVENTION

Problem to be Solved

However, in the linear guide apparatus shown in FIG. 15 and the linear guide apparatus shown in FIG. 16, there are the following problems.

That is, in the case of the linear guide apparatus shown in FIG. 15, the lubricant from the lubricant feed members 115 does not sufficiently reach the hard seal members 117 arranged at the outermost sides of the slider 102 in the axial direction. This is because the plurality of soft seal members 121, 111, and 120 positioned between the hard seal members 117 and the lubricant feed members 115 snatches up the lubricant. Accordingly, the lip parts of the hard seal members 117 arranged at the outermost side are insufficiently lubricated, the lip parts become worn, and the dust-proof performance degrades.

Further, in the case of the linear guide apparatus shown in FIG. 16, the flexible sliding member 212 are deformed by the pressure on the lubricating oil storing member 213. When the flexible sliding member 212 is deformed and brought into contact with the lubricating oil storing member 213, the pressing force of the lip parts of the flexible sliding member 212 on the sliding surface 215 degrades. Accordingly, there is a problem that the dust-proof performance in the flexible sliding member 212 degrades.

Therefore, the present invention has been made in consideration of the above problems and has an object to provide a linear guide apparatus that keeps a high dust-proof performance over a long time period.

Solution to the Problem

To achieve the above object, according to one aspect of the present invention, there is provided a linear guide apparatus comprising: a guide rail having rolling element rolling grooves extending in an axial direction; and a slider having rolling element rolling grooves facing the rolling element rolling grooves of the guide rail straddling the guide rail to be capable of moving relatively in the axial direction through rolling of a large number of rolling elements inserted between the rolling element rolling grooves, the linear guide apparatus comprises a side seal unit attached to an axial direction end part of the slider, the side seal unit comprises a first seal member, at the slider side, arranged along the axial direction of the slider, a second seal member at an outside of the slider in the axial direction, and a lubricating member held between the first seal member and the second seal member, the first seal member comprises first lip parts sliding against the rolling element rolling grooves of the guide rail, the second seal member comprises second lip parts sliding against the rolling element rolling grooves of the guide rail, the lubricating member comprises a first oil-containing member for supplying lubricant to the rolling element rolling grooves of the guide rail, and the first lip parts and the first oil-containing member are arranged not to come into contact with each other, and the second lip parts and the first oil-containing member are arranged not to come into contact with each other.

Further, in this linear guide apparatus, the first seal member may comprise a first seal plate having the first lip parts and a first holding plate for holding the first seal plate, the second seal member may comprise a second seal plate having the second lip parts and a second holding plate for holding the second seal plate, the lubricating member may comprise the first oil-containing member and a case for holding the first oil-containing member, the case may be used to avoid mutual contact between the first lip parts and the first oil-containing member, and the second holding plate may be used to avoid mutual contact between the second lip parts and the first oil-containing member.

Furthermore, in this linear guide apparatus, an auxiliary side seal may be provided between the side seal unit and an axial direction end part of the slider, and the auxiliary side seal comprises third lip parts sliding against the rolling element rolling grooves of the guide rail.

Further, in this linear guide apparatus, the breakage strength of the third lip parts may be smaller than those of the first lip parts, and is smaller than those of the second lip parts.

Further, in this linear guide apparatus, an auxiliary lubricating member may be provided between the auxiliary side seal and an axial direction end part of the slider, and the auxiliary lubricating member may comprise a second oil-containing member for supplying lubricant to the rolling element rolling grooves of the guide rail.

Advantageous Effects of the Invention

According to the linear guide apparatus of the present invention, the side seal unit comprises a first seal member, at the slider side, arranged along the axial direction of the slider, a second seal member at an outside of the slider in the axial direction, and a lubricating member held between the first seal member and the second seal member, and the first seal member comprises first lip parts sliding against the rolling element rolling grooves of the guide rail, the second seal member comprises second lip parts sliding against the rolling element rolling grooves of the guide rail, the lubricating member comprises a first oil-containing member for supplying lubricant to the rolling element rolling grooves of the guide rail. Therefore, the lubricant is supplied to both of the first lip parts and the second lip parts sliding against the rolling element rolling grooves. Accordingly, it is possible to maintain the first lip parts and the second lip parts in a state of little wear over a long period of time, without insufficient lubrication at the first lip parts of the first seal member and the second lip parts of the second seal member, The can be maintained.

Further, the first lip parts and the first oil-containing member are arranged not to come into contact with each other, and the second lip parts and the first oil-containing member are arranged not to come into contact with each other, so that the pressing forces of the first lip parts and the second lip parts against the rolling element rolling grooves will never degrade. It is therefore possible to maintain a high z dust-proof performance over a long period of time.

Further, in this linear guide apparatus, when the first seal member comprises a first seal plate having the first lip parts and a first holding plate for holding the first seal plate, the second seal member comprises a second seal plate having the second lip parts and a second holding plate for holding the second seal plate, the lubricating member comprises the first oil-containing member and a case for holding the first oil-containing member, the case is used to avoid mutual contact between the first lip parts and the first oil-containing member, and the second holding plate is used to avoid mutual contact between the second lip parts and the first oil-containing member, it is possible to avoid mutual contact of the first lip parts and first oil-containing member and mutual contact of the second lip parts and first oil-containing member with certainty.

Furthermore, in this linear guide apparatus, when an auxiliary side seal is provided between the side seal unit and an axial direction end part of the slider, and the auxiliary side seal comprises third lip parts sliding against the rolling element rolling grooves of the guide rail, even if the dust-proof performance of the side seal unit degrades along with a long-term vehicle operation, it is possible to maintain the overall dust-proof performance with the auxiliary side seal.

Further, in this linear guide apparatus, when the breakage strength of the third lip parts is smaller than those of the first lip parts, and is smaller than those of the second lip parts, it is possible to inexpensively produce the third lip parts of the auxiliary side seal. The third lip parts are positioned at the inner side in the axial direction of the slider (slider side) more than the first lip parts and second lip parts. Thus, it is difficult for foreign matters to enter the third lip parts from the outside. Therefore, the third lip parts may have a wear resistance and breakage strength smaller than those of the first lip parts and second lip parts.

Furthermore, in this linear guide apparatus, when an auxiliary lubricating member is provided between the auxiliary side seal and an axial direction end part of the slider, and the auxiliary lubricating member comprises a second oil-containing member for supplying lubricant to the rolling element rolling grooves of the guide rail, the lubricant is supplied from the second oil-containing member of the auxiliary lubricating member to the rolling element rolling grooves of the guide rail. As a result, the lubricant is supplied to the third lip parts of the auxiliary side seal sliding against the rolling element rolling grooves. Accordingly, the third lip parts of the auxiliary side seal are maintained in a state of little wear over a long period of time. Therefore, even if the dust-proof performance of the side seal unit degrades along with long vehicle operation, it is possible to maintain the dust-proof performance with the dust-proof performance of the auxiliary side seal.

BRIEF DESCRIPTION OF THE DRAWINGS

FIG. 8 is a cross-sectional schematic view for explaining the action of the side seal unit in the linear guide apparatus shown in FIG. 1;

FIG. 9 is a perspective view showing a second embodiment of a linear guide apparatus according to the present invention;

DESCRIPTION OF EMBODIMENTS

Hereinafter, embodiments of the linear guide apparatus according to the present invention will be explained with reference to the drawings.

Figure 1:
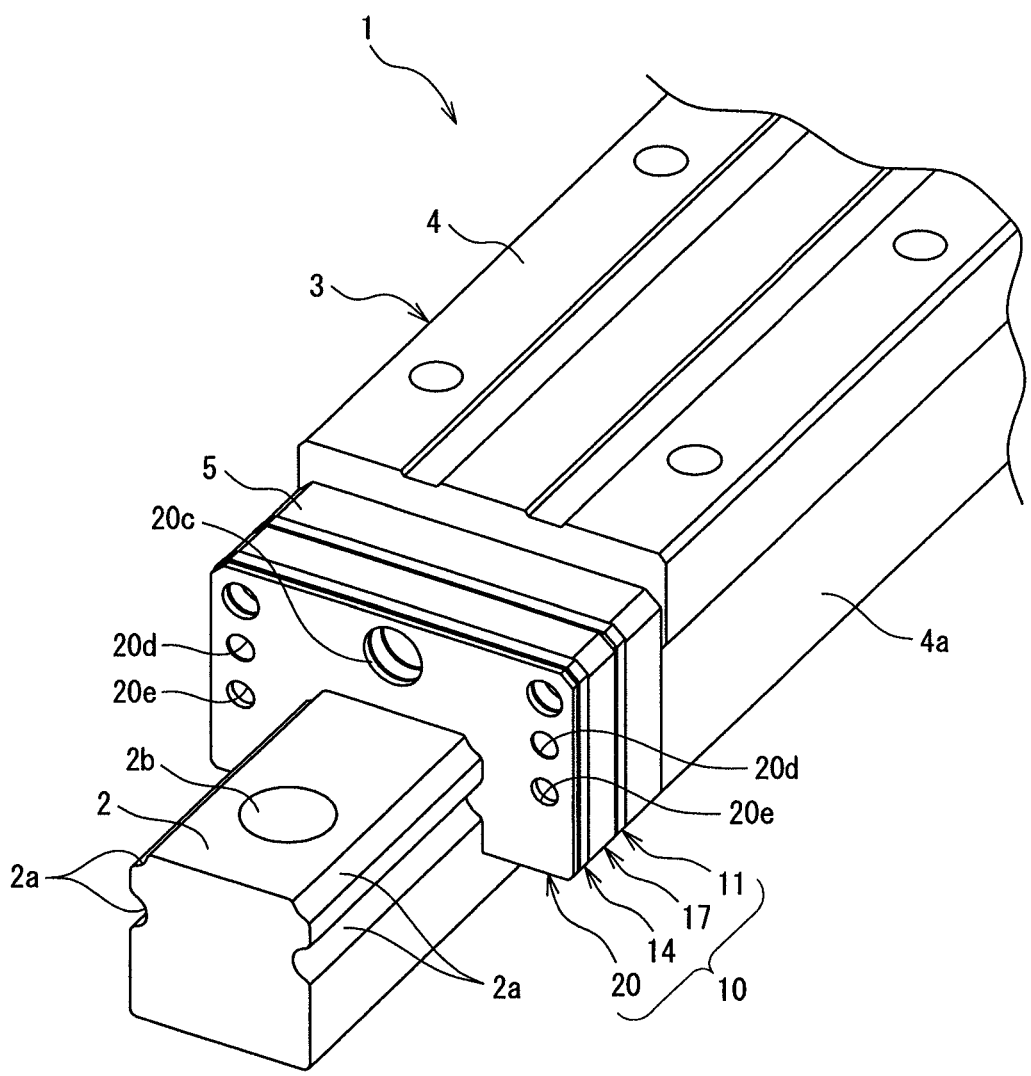
FIG. 1 is a perspective view showing a first embodiment of a linear guide apparatus according to the present invention.
Figure 2:
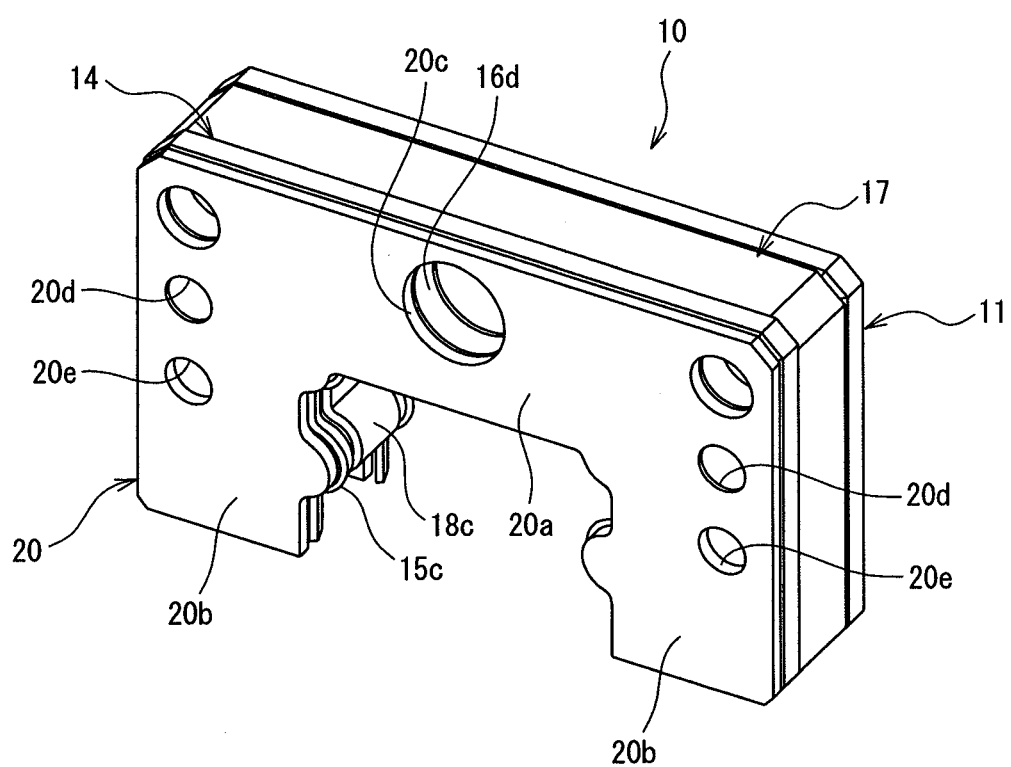
FIG. 2 is a perspective view of a side seal unit used for the linear guide apparatus shown in FIG. 1.
Figure 3:
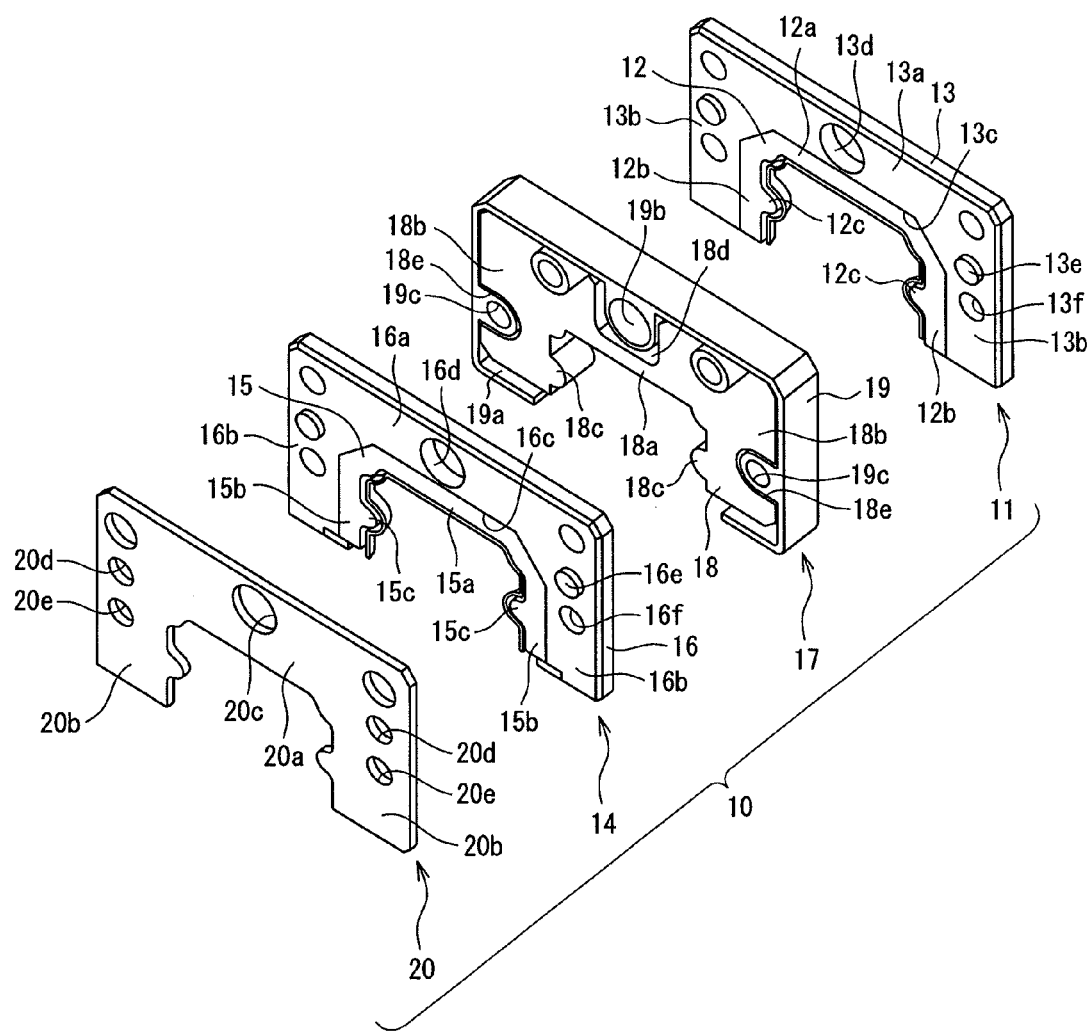
FIG. 3 is a disassembled perspective view of the side seal unit shown in FIG. 2.
Figure 4:
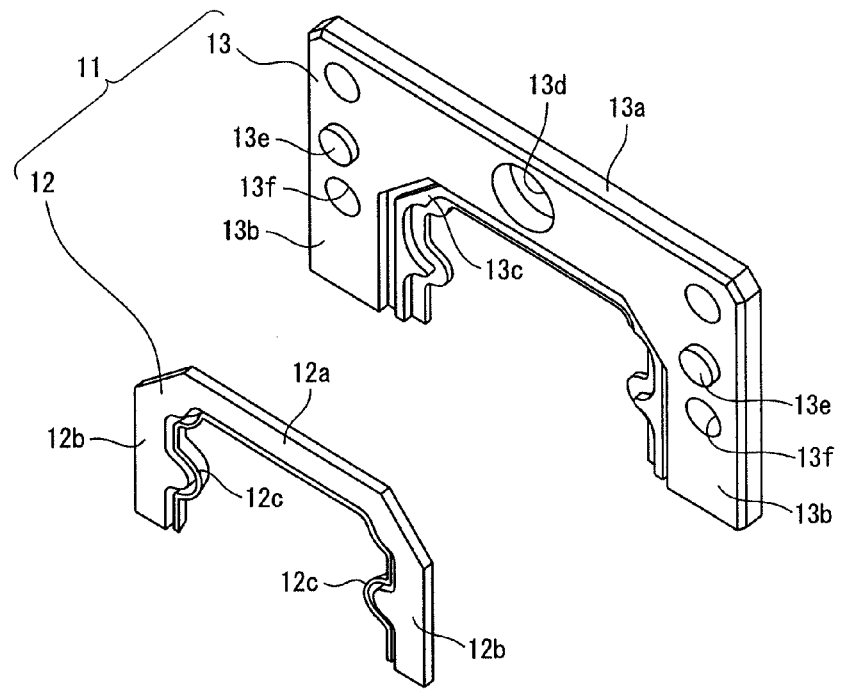
FIG. 4 is a disassembled perspective view of a first seal member used in the side seal unit shown in FIG. 2.
Figure 5:
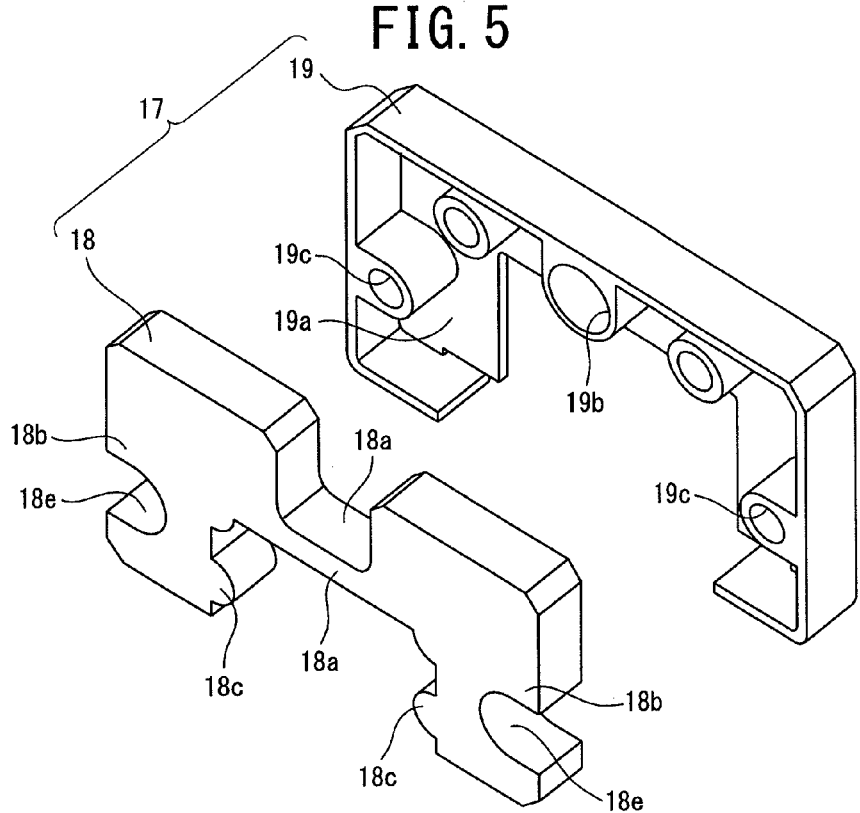
FIG. 5 is a disassembled perspective view of a lubricating member used in the side seal unit shown in FIG. 2.
Figure 6:
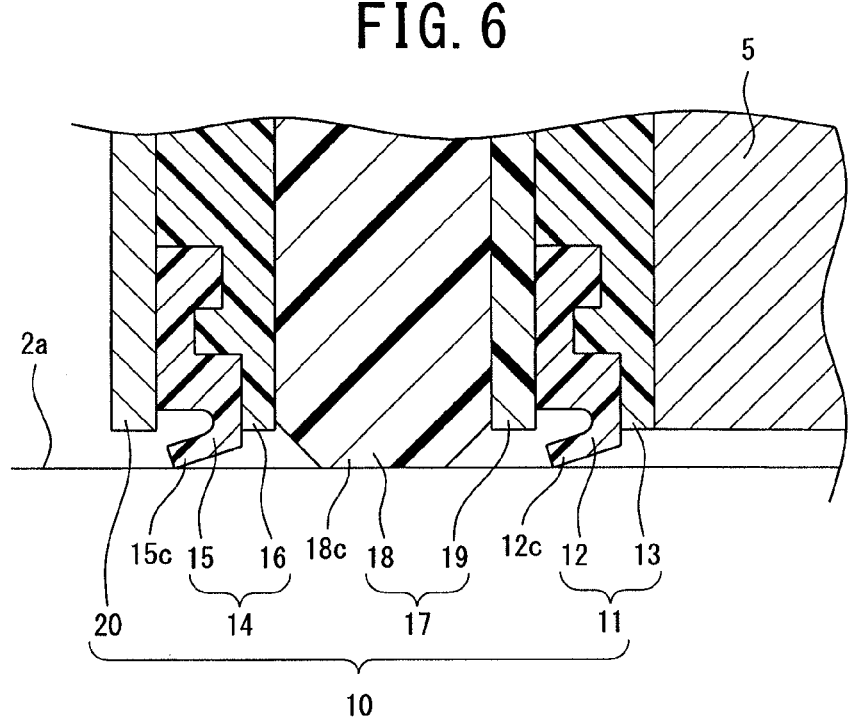
FIG. 6 is a cross-sectional schematic view of the vicinity of the side seal unit of the linear guide apparatus shown in FIG. 1.
Figure 7:
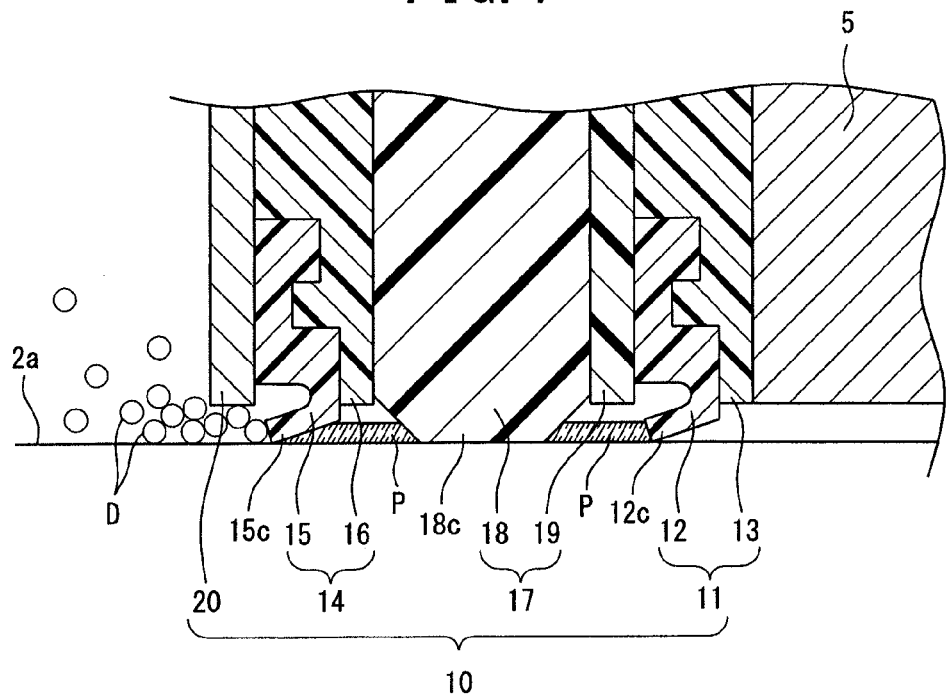
FIG. 7 is a cross-sectional schematic view for explaining the action of the side seal unit in the linear guide apparatus shown in FIG. 1.

FIG. 1 is a perspective view showing a first embodiment of a linear guide apparatus according to the present invention. FIG. 2 is a perspective view of a side seal unit used for the linear guide apparatus shown in FIG. 1. FIG. 3 is a disassembled perspective view of the side seal unit shown in FIG. 2. FIG. 4 is a disassembled perspective view of a first seal member used in the side seal unit shown in FIG. 2. FIG. 5 is a disassembled perspective view of a lubricating member used in the side seal unit shown in FIG. 2. FIG. 6 is a cross-sectional schematic view of the vicinity of the side seal unit of the linear guide apparatus shown in FIG. 1. FIG. 7 is a cross-sectional schematic view for explaining the action of the side seal unit in the linear guide apparatus shown in FIG. 1. FIG. 8 is a cross-sectional schematic view for explaining the action of the side seal unit in the linear guide apparatus shown in FIG. 1.

The linear guide apparatus 1 shown in FIG. 1 is provided with: a guide rail 2 which extends in the axial direction; and a slider 3 which straddles the guide rail 2 capable of moving relatively in the axial direction.

The two side surfaces of the guide rail 2 are formed with two rolling element rolling grooves 2a which extend in the axial direction. The slider body 4 of the slider 3 is formed at the inner surfaces of its two sleeve parts 4a with rolling element rolling groove (not shown) which face these rolling element rolling grooves 2a. Further, a large number of balls (not shown) are loaded rollably between the facing rolling element rolling grooves 2a formed at the guide rail 2 and the rolling element rolling grooves formed at the slider body 4, as an example of the rolling elements. Through the rolling action of these balls, the slider 3 can move on relatively to the guide rail 2 in the axial direction.

Along with this movement of the slider 3, the balls interposed between the guide rail 2 and the slider 3 roll and travel to the end parts of the slider 3. To enable the slider 3 to continue to move in the axial direction, these balls have to be made to endlessly circulate.

For this reason, rolling element passages (not shown) are formed to penetrate in the axial direction in the sleeve parts 4a of the slider body 4, and the both ends of the slider body 4 in the axial direction have substantially U-shaped end caps 5 secured to them. Further, direction changing channels (not shown) bent in semi-circular shapes connecting with the rolling element passages are formed at the end caps 5, between the rolling element rolling grooves 2a formed at the guide rail 2 and the rolling element rolling grooves formed at the slider body 4, so that rolling element endless circulation raceways are formed. Note that, in FIG. 1, reference numeral 2b indicates a bolt hole for securing the guide rail 2 to another member.

Further, at the two end parts of the end caps 5 of the slider 3 in the axial direction, a pair of side seal units 10 (in FIG. 1, only one side seal unit 10 is shown) are attached. The pair of side seal units 10 are symmetrical in shape, so only one side seal unit 10 will be explained.

The side seal unit 10, as shown in FIG. 1 to FIG. 3, is provided with, arranged along the axial direction of the slider 3, a first seal member 11 at the slider 3 side and a second seal member 14 at the outside of the slider 3 in the axial direction, a lubricating member 17 held between the first seal member 11 and the second seal member 14, and a cover member 20.

The first seal member 11 at the slider 3 side, as shown in FIG. 3 and FIG. 4, is provided with: a first seal plate 12; and a first holding plate 13 for holding the first seal plate 12. The first seal plate 12 is provided with: a base plate part 12a formed in a substantially U-shaped cross-section so as to straddle the guide rail 2 and extending in a direction traversing the guide rail 2; and a pair of side plate parts 12b extending from both ends of the base plate part 12a in the direction traversing the rail downward along the two side surfaces of the guide rail 2. The side plate parts 12b of the first seal plate 12, as shown in FIG. 3, FIG. 4, and FIG. 6, are provided with first lip parts 12c sliding against the rolling element rolling grooves 2a of the guide rail 2. The first seal plate 12 is formed by injection molding a high flexibility polyester-based elastomer, urethane-based elastomer, or other synthetic resin or nitrile rubber, fluororubber, or another type of rubber. As specific product names of polyester-based elastomers, for example, there are Toyobo's Pelprene (registered trademark) EN1000, EN2000, EN3000, EN5000, etc. The first lip parts 12c have a pressing margin of 0.1 mm to 0.3 mm with respect to the surfaces of the rolling element rolling grooves 2a of the guide rail 2, when the side seal unit 10 is attached to the end face of the end cap 5 in the axial direction. This can give a suitable pressing force.

On the other hand, the first holding plate 13 for holding the first seal plate 12 is provided with: a base part 13a formed in a substantially U-shaped cross-section so as to straddle the guide rail 2 and extending in the direction traversing the guide rail 2; and a pair of side parts 13b which extend from both ends of the base part 13a in the direction traversing the rail downward along the two side surfaces of the guide rail 2. The inner parts of the base part 13a and the pair of side parts 13b are formed with a first seal plate holding part 13c for housing and holding the first seal plate 12. The center part of the base part 13a in the direction traversing the rail is formed with a greasing nipple-use opening 13d. Further, one surface of each of the pair of side parts 13b is provided with a positioning-use projection 13e for positioning the first holding plate 13 at the lubricating member 17. Further, each of the pair of side parts 13b is formed with a screw through hole 13f through which a mounting screw (not shown) for securing the side seal unit 10 to the end cap 5 is inserted. The first holding plate 13 is attached to the axial direction end face of the end cap 5. The first holding plate 13 is formed by molding a polyacetal, polyamide, or another hard synthetic resin.

The lubricating member 17 held between the first seal member 11 and the second seal member 14, as shown in FIG. 5, is provided with a first oil-containing member 18 and a case 19 for accommodating the first oil-containing member 18. The first oil-containing member 18 is provided with a base part 18a formed in a substantially U-shaped cross-section so as to straddle the guide rail 2 and extending in the direction traversing the guide rail 2 and a pair of dangling parts 18b which extend from both ends of the base part 18a in the direction traversing the rail downward along the two side surfaces of the guide rail 2. The dangling parts 18b, as shown in FIG. 3, FIG. 5, and FIG. 6, are provided with projecting contact parts 18c in contact with the rolling element rolling grooves 2a of the guide rail 2. Further, the center part of the base part 18a in the direction traversing the rail is formed with a first cutaway part 18d, while the outer part of the pair of dangling parts 18b is formed with a second cutaway part 18e. Further, this first oil-containing member 18 is configured to come into contact with the rolling element rolling grooves of the guide rail 2 by the contact parts 18c to supply the lubricant, and, for example, is formed by injection molding a material of a mixture of a polyolefin-based resin and mineral oil. Note that, the first oil-containing member 18 may also be produced by felt impregnated with a lubricant or a porous material impregnated with a lubricant. Further, as the lubricant, oil or grease is used.

On the other hand, the case 19 for accommodating the first oil-containing member 18 is formed to have a substantially U-shaped cross-section so as to straddle the guide rail 2, and has a first oil-containing member accommodating concave part 19a for accommodating the first oil-containing member 18 and opens to the outer surface of the slider 3 in the axial direction. The center part of the first oil-containing member accommodating concave part 19a in the direction traversing the rail is formed with a greasing nipple-use opening 19b. Further, the two wide parts of the first oil-containing member accommodating concave part 19a in the direction traversing the rail are formed with screw through holes 19c into which mounting screws (not shown) are inserted to secure the side seal unit 10 to the end cap 5. The greasing nipple-use opening 19b, as shown in FIG. 3, is positioned in the first cutaway part 18d of the first oil-containing member 18. Further, the screw through holes 19c are positioned in the second cutaway part 18e of the first oil-containing member 18. Note that, the case 19 is arranged at the first seal member 11 side.

Further, the second seal member 14 at the outside of the slider 3 in the axial direction, as shown in FIG. 3, is provided with: a second seal plate 15; and a second holding plate 16 for holding the second seal plate 15. The second seal plate 15 is provided with: a base plate part 15a formed in a substantially U-shaped cross-section so as to straddle the guide rail 2 and extending in the direction traversing the guide rail 2; and a pair of side plate parts 15b extending from both ends of the base plate part 15a downward along the two side surfaces of the guide rail 2. The side plate parts 15b of the second seal plate 15, as shown in FIG. 3, FIG. 4, and FIG. 6, are provided with projecting second lip parts 15c sliding against the rolling element rolling grooves 2a of the guide rail 2. The second seal plate 15, in the same way as the first seal plate 12, is formed by injection molding a high flexibility polyester-based elastomer, urethane-based elastomer, or other synthetic resin or nitrile rubber, fluororubber, or another type of rubber. As specific product names of polyester-based elastomers, for example, there are Toyobo's Pelprene (registered trademark) EN1000, EN2000, EN3000, EN5000, etc. The second lip parts 15c have a pressing margin of 0.1 mm to 0.3 mm with respect to the surfaces of the rolling element rolling grooves 2a of the guide rail 2, when the side seal unit 10 is attached to the end face of the end cap 5 in the axial direction. This can give a suitable pressing force.

On the other hand, the second holding plate 16 for holding the second seal plate 15 is provided with: a base part 16a the same shape as the first holding plate 13, formed in a substantially U-shaped cross-section so as to straddle the guide rail 2, and extending in the direction traversing the guide rail 2; and a pair of side parts 16b which extend from both ends of the base part 16a downward along the two side surfaces of the guide rail 2. The inner parts of the base part 16a and the pair of side parts 16b are formed with a second seal plate accommodating part 16c for accommodating and holding the second seal plate 15. The center part of the base part 16a in the direction traversing the rail is formed with a greasing nipple-use opening 16d. Further, single surfaces of the pair of side parts 16b are provided with positioning-use projections so as to position the cover member 20 with respect to the second holding plate 16. Further, each of the pair of side parts 16b is formed with a screw through hole 16f through which a mounting screw (not shown) for securing the side seal unit 10 to the end cap 5 is formed. The second holding plate 16 is arranged at the lubricating member 17 side.

Further, the cover member 20, as shown in FIG. 2 and FIG. 3, is provided with: a base plate part 20a formed in a substantially U-shaped cross-section so as to straddle the guide rail 2 and extending in the direction traversing the guide rail 2; and a pair of side plate parts 20b extending from both ends of the base plate part 20a in the direction traversing the rail downward along the two side surfaces of the guide rail 2. The cover member 20 is attached to the outside of the second seal member 14 in the axial direction. The center part of the base plate part 20a in the direction traversing the rail is formed with a greasing nipple-use opening 20c. Further, each of the pair of side plate parts 20b is provided with a positioning projection-use hole 20d into which a positioning-use projection 16e of the second holding plate 16 is inserted. Further, each of the pair of side plate parts 20b is formed with a screw through hole 20e through which a mounting screw (not shown) for securing the side seal unit 10 to the end cap 5 is formed. The cover member 20 is formed by press forming a steel sheet or hard synthetic resin. The thickness of the cover member 20 is about 0.5 mm to 2 mm. Further, the cover member 20 is designed not to come into contact with the surfaces of the rolling element rolling grooves 2a of the guide rail, when the side seal unit 10 is attached to the end face of the end cap 5 in the axial direction; for example, to have a clearance of 0.1 mm to 0.5 mm from them.

The side seal unit 10, at the time of assembly, has the first seal member 11, the lubricating member 17, the second seal member 14, and the cover member 20 attached from the end face of the end cap 5 in the axial direction of the slider 3. Mounting screws, not shown, are passed through the screw through holes 20e of the cover member 20 at the outside of the slider 3 in the axial direction, the screw through holes 16f of the second seal member 14, the screw through holes 19c of the lubricating member 17, and the screw through holes 13f of the first seal member 11 in that order, and secure the first seal member 11, the lubricating member 17, the second seal member 14, and the cover member 20 to the end cap 5.

When assembling the side seal unit 10 to the end cap, as shown in FIG. 6, the first lip parts 12c of the first seal member 11 and the first oil-containing member 18 of the lubricating member 17 are arranged so as not to be in contact with each other. In addition, the second lip parts 15c of the second seal member 14 and the first oil-containing member 18 of the lubricating member 17 are arranged so as not to be in contact with each other.

Further, the case 19 of the lubricating member 17 avoids mutual contact of the first lip parts 12c of the first seal member 11 and the first oil-containing member 18, and the second holding plate 16 of second seal member 14 avoids mutual contact of the second lip parts 15c of the second seal member 14 and the first oil-containing member 18.

The slider 3 slides relatively on the guide rail 2 in the axial direction, but at this time, as shown in FIG. 7, lubricant P is supplied from the first oil-containing member 18 of the lubricating member 17 held between the first seal member 11 and the second seal member 14 to the rolling element rolling grooves 2a of the guide rail 2. As a result, the lubricant P is supplied to both the first lip parts 12c and second lip parts 15c which slide against the rolling element rolling grooves 2a. For this reason, the first lip parts 12c of the first seal member 11 and the second lip parts 15c of the second seal member 14 will never become insufficiently lubricated, to maintain the first lip parts 12c and second lip parts 15c in a state with little wear over a long period of time.

Here, as shown in FIG. 7, when there are foreign matters D at the outside of the second seal member 14 in the axial direction, since the second lip parts 15c of the second seal member 14 slide against the surfaces of the rolling element rolling grooves 2a of the guide rail 2, the foreign matters D do not pass through the first seal plate 14 and do not reach the first lip parts 12c of the first seal member 11. Further, even if the foreign matters D are in a powder state such as sawdust and the lubricant P in the vicinity of the second lip parts 15c of the second seal member 14 is absorbed by the foreign matter D, the second lip parts 15c are supplied with lubricant P from the first oil-containing member 18. Accordingly, the second lip parts 15c will never be insufficiently lubricated.

Further, since the first lip parts 12c of the first seal member 11 and the first oil-containing member 18 are arranged so as not to be in mutual contact with each other, and the second lip parts 15c of the second seal member 14 and the first oil-containing member 18 are arranged so as not to be in mutual contact with each other, the pressing forces of the first lip parts 12c and the second lip parts 15c on the rolling element rolling grooves 2a do not degrade. It is therefore possible to maintain a high dust-proof performance over a long period of time.

Further, the case 19 of the lubricating member 17 avoids the mutual contact of the first lip parts 12c and the first oil-containing member 18, and the second holding plate 16 avoids the mutual contact of the second lip parts 15c and the first oil-containing member 18. It is therefore possible to avoid the mutual contact of the first lip parts 12c and first oil-containing member 18 and mutual contact of the second lip parts 15c and first oil-containing member 18 with certainty.

Note that, when the side seal unit 10 is used over an extremely long period of time, as shown in FIG. 8, the second lip parts 15c of the second seal member 14 at the outside of the slider 3 in the axial direction will possibly be worn. In this case, the foreign matters D will pass through the second seal member 14 and reach the first seal member 11. Here, the first oil-containing member 18 exerts a little pressing force against the surface of the rolling element rolling grooves 2a, and hardly exhibits the dust-proof performance. Almost all of the foreign matters D will pass through the first oil-containing member 18. In this case as well, since the first lip parts 12c of the first seal member 11 slide against the rolling element rolling grooves 2a and are supplied with lubricant P from the first oil-containing member 18, a state with little wear and a sufficient dust-proof performance is maintained. Therefore, the foreign matters D will never pass through the first seal member 11.

Figure 10:
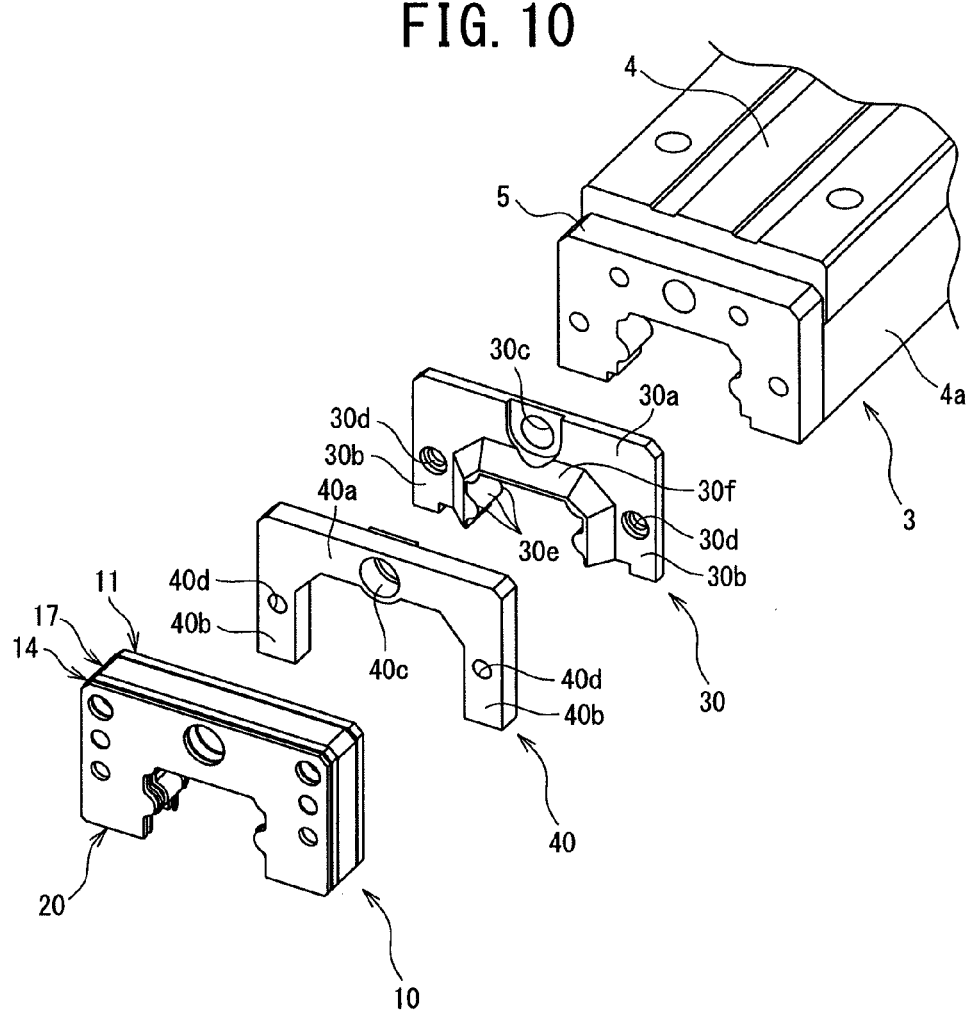
FIG. 10 is a perspective view showing the side seal unit, the spacer, and the auxiliary side seal used for the linear guide apparatus shown in FIG. 9 separated from the slider.
Figure 11:
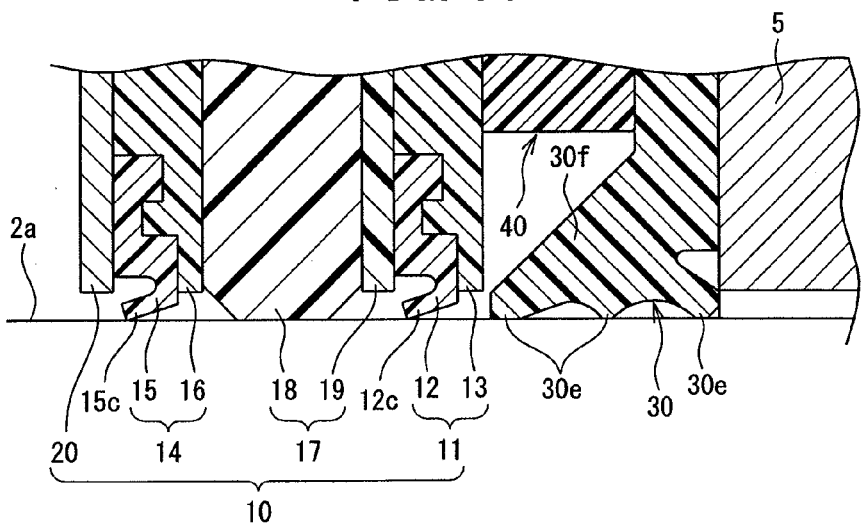
FIG. 11 is a cross-sectional schematic view of the vicinity of the side seal unit of the linear guide apparatus shown in FIG. 9.

Next, a second embodiment of the linear guide apparatus according to the present invention will be explained with reference to FIG. 9 to FIG. 11. FIG. 9 is a perspective view showing a second embodiment of a linear guide apparatus according to the present invention. FIG. 10 is a perspective view showing a side seal unit, a spacer, and an auxiliary side seal used for the linear guide apparatus shown in FIG. 9 separated from the slider. FIG. 11 is a cross-sectional schematic view of the vicinity of the side seal unit of the linear guide apparatus shown in FIG. 9. In FIG. 9 to FIG. 11, elements the same as those shown in FIG. 1 to FIG. 8 are assigned with the same reference numerals and explanations thereof are omitted.

The linear guide apparatus 1 shown in FIG. 9 to FIG. 11 is similar in basic configuration to that of the linear guide apparatus 1 according to the first embodiment shown in FIG. 1 to FIG. 8, but differs from the linear guide apparatus 1 shown in FIG. 1 to FIG. 8 in that an auxiliary side seal 30 and a spacer 40 are provided between the side seal unit 10 and an axial direction end part of the slider 3 (actually, the end cap 5).

That is, as shown in FIG. 9 to FIG. 11, between the side seal unit 10 and the end cap 5, an auxiliary side seal 30 and spacer 40 are provided in this order from the axial direction end face of the end cap 5 in the axial direction of the slider 3.

Here, the auxiliary side seal 30, as shown in FIG. 10, is provided with: a base plate part 30*a* formed to have a substantially U-shaped cross-section so as to straddle the guide rail 2 and extending in the direction traversing the guide rail 2; and a pair of side plate parts 30*b* extending from both ends of the base plate part 30*a* in the direction traversing the rail downward along the two side surfaces of the guide rail 2. The base plate part 30*a* and inner parts of the pair of side plate parts 30*b* of the auxiliary side seal 30 are provided with a bulging part 30*f* which bulges out toward the outside of the slider 3 in the axial direction. The parts of this bulging part 30*f* corresponding to the side plate parts 30*b*, as shown in FIG. 10 and FIG. 11, are provided with three third lip parts 30*e* sliding against the rolling element rolling grooves 2*a* of the guide rail 2. The three third lip parts 30*e* slide in the axial direction of the guide rail 2 at a predetermined pitch on the surface of the rolling element rolling grooves 2*a*. Further, the center part of the base plate part 30*a* in the direction traversing the rail is formed with a greasing nipple-use opening 30*c*. Further, each of the pair of side plate parts 30*b* is formed with a screw through hole 30*d* through which a mounting screw (not shown) is inserted to secure the auxiliary side seal 30 to the end cap 5.

In this way, an auxiliary side seal 30 is provided between the side seal unit 10 and the axial direction end part of the slider 3 (actually, the end cap 5). The auxiliary side seal 30 is provided with third lip parts 30*e* sliding against the rolling element rolling grooves 2*a* of the guide rail 2. Even if the dust-proof performance of the side seal unit 10 degrades according to a long-term vehicle operation, it is possible to maintain the overall dust-proof performance by the auxiliary side seal 30. Here, since the auxiliary side seal 30 has three third lip parts 30*e*, even a single unit has a high dust-proof performance.

This auxiliary side seal 30 is formed by injection molding a high flexibility polyester-based elastomer, urethane-based elastomer, or other synthetic resin or nitrile rubber, fluororubber, or another type of rubber. However, the third lip parts 30*e* of the auxiliary side seal unit 30 are preferably made of a material different from those of the first lip parts 12*c* of the first seal plate 12 and the second lip parts 15*c* of the second seal plate 15 constituting the side seal unit 10. The first lip parts 12*c* of the first seal plate 12 and the second lip parts 15*c* of the second seal plate 15 are preferably made of a polyester-based elastomer with a breakage strength of 30 MPa or more (as specific product names, Toyobo's Pelprene (registered trademark) EN1000, EN2000, EN3000, EN5000, etc.) and the third lip parts 30*e* of the auxiliary side seal unit 30 are preferably made of nitrile rubber or fluororubber or another type of rubber material with a breakage strength of 10 to 20 MPa or so.

In this way, if the breakage strength of the third lip parts 30*e* is made smaller than that of the first lip parts 12*c* and smaller than that of the second lip parts 15*c*, it is possible to inexpensively produce the third lip parts 30*e* of the auxiliary side seal 30. The third lip parts 30*e*, as shown in FIG. 11, are positioned further inside from the slider 3 in the axial direction (slider 3 side) than the first lip parts 12*c* and second lip parts 15*c*, so it is harder for the foreign matters D to enter the third lip parts 30*e* from the outside. For this reason, the third lip parts 30*e* may be lower in wear resistance and lower in breakage strength than those of the first lip parts 12*c* and second lip parts 15*c*.

Further, the spacer 40, as shown in FIG. 9 to FIG. 11, is a plate-shaped member having a substantially U-shaped cross-section to be inserted between the first seal member 11 and the auxiliary side seal 30 of the side seal unit 10, and configured to straddle the guide rail 2. The spacer 40 is provided with: a base plate part 40*a* extending in the direction traversing the guide rail 2; and a pair of side plate parts 40*b* extending from both ends of the base plate part 40*a* in the direction traversing the rail downward along the two side surfaces of the guide rail 2. The center part of the base plate part 40*a* of the spacer 40 in the direction traversing the rail is formed with a greasing nipple-use opening 40*c*. Further, each of the pair of side plate parts 40*b* is formed with a screw through hole 40*d* through which a mounting screw (not shown) is inserted to secure the spacer 40 to the end cap 5.

By interposing this spacer 40 between the first holding plate 13 of the first seal member 11 and the auxiliary side seal 30, as shown in FIG. 11, the distance between the first holding plate 13 of the first seal member 11 and the auxiliary side seal 30 increases to have a predetermined clearance. It is thus possible to avoid the projection and recess parts formed at the surface of the auxiliary side seal 30 (parts including bulging parts 30*f*) from coming into contact with the first holding plate 13.

Figure 12:
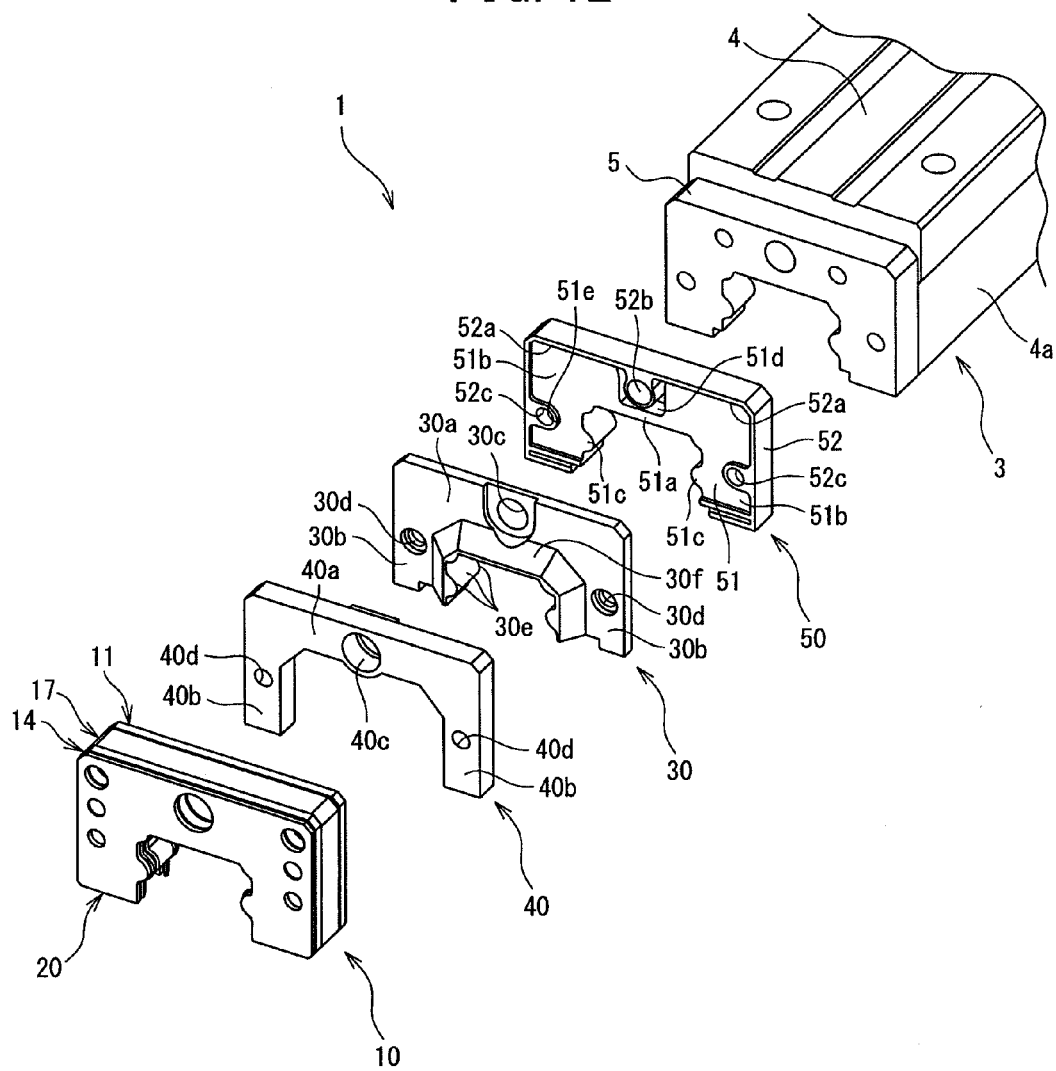
FIG. 12 is a perspective view showing a linear guide apparatus according to a third embodiment of the present invention and shows a side seal unit, spacer, auxiliary side seal, and auxiliary lubricating member separated from the slider.
Figure 13:
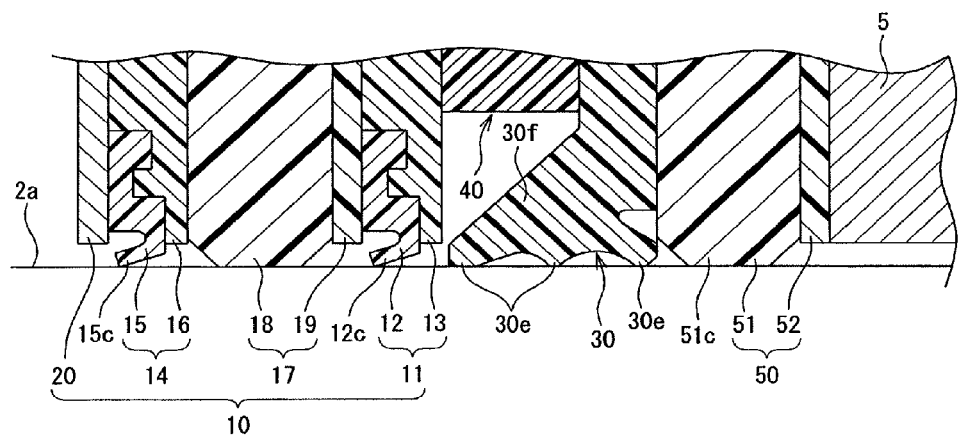
FIG. 13 is a cross-sectional schematic view of the vicinity of the side seal unit of the linear guide apparatus shown in FIG. 12.
Figure 14:
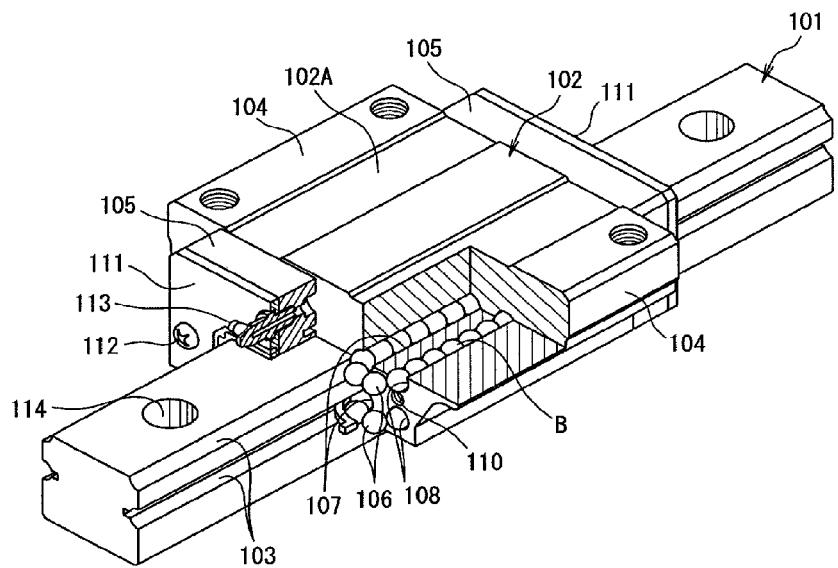
FIG. 14 is a perspective view showing one example of a conventional linear guide apparatus.
Figure 15:
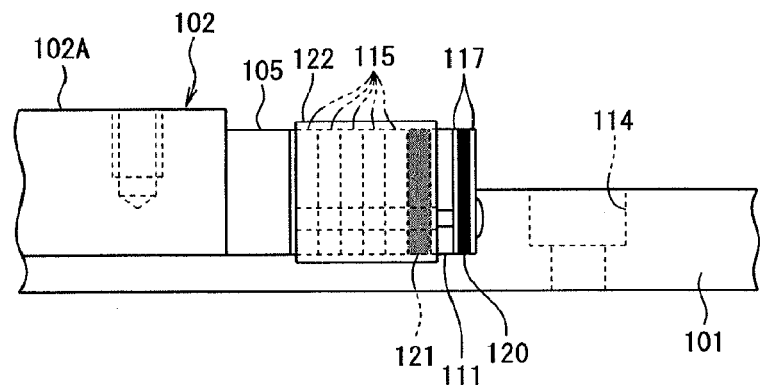
FIG. 15 is a partial side surface view showing another example of a conventional linear guide apparatus.
Figure 16:
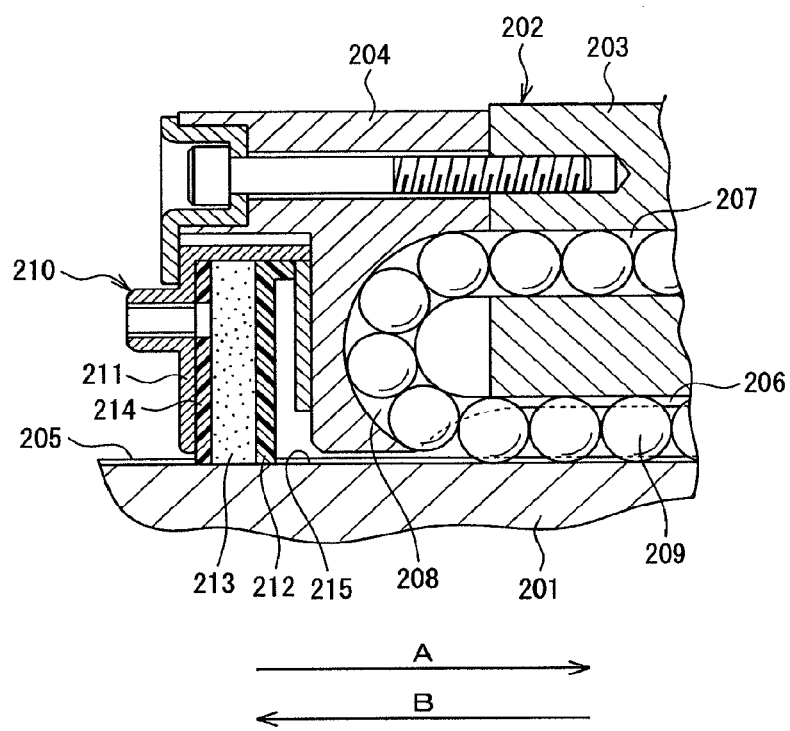
FIG. 16 is a partial cross-sectional view which shows another example of a conventional linear guide apparatus.

Next, a linear guide apparatus according to a third embodiment of the present invention will be explained with reference to FIG. 12 and FIG. 13. FIG. 12 is a perspective view showing the linear guide apparatus according to the third embodiment of the present invention, and shows a side seal unit, a spacer, an auxiliary side seal, and an auxiliary lubricating member separated apart from the slider. FIG. 13 is a cross-sectional schematic view of the vicinity of the side seal unit of the linear guide apparatus shown in FIG. 12. In FIG. 12 and FIG. 13, elements which are the same as those shown in FIG. 9 to FIG. 11 are assigned with the same reference numerals and explanations thereof are omitted.

The linear guide apparatus 1 shown in FIG. 12 and FIG. 13 has a basic configuration similar to that of the linear guide apparatus 1 according to the second embodiment shown in FIG. 9 to FIG. 11, but differs from the linear guide apparatus 1 shown in FIG. 9 to FIG. 11 in that an auxiliary lubricating member 50 is provided between the auxiliary side seal 30 and the axial direction end part of the slider 3 (actually, the end cap 5).

Here, the auxiliary lubricating member 50, as shown in FIG. 12 and FIG. 13, is provided with: a second oil-containing member 51; and a case 52 for accommodating the second oil-containing member 51. The second oil-containing member 51 is provided with: a base part 51a formed to have a substantially U-shaped cross-section so as to straddle the guide rail 2 and extending in the direction traversing the guide rail 2; and a pair of dangling parts 51b extending from both ends of the base part 51a in the direction traversing the rail downward along the two side surfaces of the guide rail 2. Each dangling part 51b has a contact part 51c projecting therefrom to be in contact with a rolling element rolling groove 2a of the guide rail 2. Further, the center part of the base part 51a in the direction traversing the rail is formed with a first cutaway part 51d. At the outer part of the pair of dangling parts 51b, a second cutaway part 51e is formed. Further, this second oil-containing member 51 is brought into contact with the rolling element rolling grooves 2a of the guide rail 2 by the contact parts 51c to supply lubricant, and is formed, for example, by injection molding a material of a mixture of a polyolefin-based resin and mineral oil. Note that, the first oil-containing member 51 may also be produced by felt impregnated with the lubricant or a porous material impregnated with the lubricant. Further, as the lubricant, oil or grease is used.

On the other hand, the case 52 for accommodating the second oil-containing member 51 has a second oil-containing member accommodating concave part 52a formed to have a substantially U-shaped cross-section so as to straddle the guide rail 2, accommodating the second oil-containing member 51, and opening to the outer surface of the slider 3 in the axial direction. The center part of the first oil-containing member accommodating concave part 52a in the direction traversing the rail is formed with a greasing nipple-use opening 52b. Further, the two side parts of the second oil-containing member accommodating concave part 52a in the direction traversing the rail are formed with screw through holes 52c through which mounting screws (not shown) are inserted for securing the side seal unit 10 to the end cap 5. The greasing nipple-use opening 52b, as shown in FIG. 12, is positioned in the first cutaway part 51d of the second oil-containing member 51. Further, the screw through holes 52c are positioned in the second cutaway part 51e of the second oil-containing member 51. Note that, the case 52 is arranged at the end cap 5 side.

According to the linear guide apparatus 1 shown in FIG. 12 and FIG. 13, an auxiliary lubricating member 50 is provided between the auxiliary side seal 30 and the axial direction end part of the slider 3 (actually, the end cap 5), and the auxiliary lubricating member 50 is provided with a second oil-containing member 52 for supplying a lubricant to the rolling element rolling grooves 2a of the guide rail 2. Therefore, the lubricant is supplied from the second oil-containing member 52 to the rolling element rolling grooves 2a of the guide rail 2. As a result, lubricant is supplied to the third lip parts 30e of the auxiliary side seal 30 sliding against the rolling element rolling groove 2a. For this reason, the third lip parts 30e of the auxiliary side seal 30 can be kept in a state where there is little wear over a long period of time. Accordingly, even if the dust-proof performance of the side seal unit 10 degrades with a long-term vehicle operation, it is possible to maintain the overall dust-proof performance of the auxiliary side seal 30.

Heretofore, embodiments of the present invention have been explained, but the present invention is not limited to these. Various changes and improvements may be made.

For example, the first seal member 11 may only have the first lip parts 12c. The present invention is not limited to the case where the first seal plate 12 and the first holding plate 13 for holding the first seal plate are provided. This applies to the second seal member 14. Further, the lubricating member 17 may only have a first oil-containing member 18 for supplying the lubricant to the rolling element rolling grooves 2a. The case 19 for accommodating the first oil-containing member 18 may be omitted.

Further, the auxiliary side seal 30 or the auxiliary lubricating member 50 does not necessarily have to be provided.

Further, the breakage strength of the third lip parts 30e does not necessarily have to be made smaller than those of the first lip parts 12c and second lip parts 15c.

REFERENCE SIGNS LIST 1 linear guide apparatus
2 guide rail
2a rolling element rolling groove
3 slider
4 slider body
4a sleeve part
5 end cap
10 side seal unit
11 first seal member
12 first seal plate
12a base plate part
12b side plate part
12c first lip part
13 first holding plate
13a base part
13b side part
13c first seal plate holding part
13d greasing nipple-use opening
13e positioning-use projection
13f screw through hole
14 second seal member
15 second seal plate
15a base plate part
15b side plate part
15c second lip part
16 second holding plate
16a base part
16b side part
16c second seal plate holding part
16d greasing nipple-use opening
16e positioning-use projection
16f screw through hole
17 lubricating member
18 first oil-containing member
18a base part
18b dangling part
18c contact part
18d first cutaway part
18e second cutaway part
19 case
19a first oil-containing member accommodating concave part
19b greasing nipple-use opening
19c screw through hole
20 cover member
20a base plate part
20b side plate part
20c greasing nipple-use opening
20d positioning projection-use hole
20e screw through hole 30 auxiliary side seal
30a base plate part
30b side plate part
30c greasing nipple-use opening
30d screw through hole
30e third lip part
30f bulging part
40 spacer
40a base plate part
40b side plate part
40c greasing nipple-use opening
40d screw through hole
50 auxiliary lubricating member
51 second oil-containing member
51a base part
51b dangling part
51c contact part
51d first cutaway part
51e second cutaway part
52 case
52a second oil-containing member accommodating concave part
52b greasing nipple-use opening
52c screw through hole
P lubricant
D foreign matter

The invention claimed is:

1. A linear guide apparatus comprising: a guide rail having rolling element rolling grooves extending in an axial direction; and a slider having rolling element rolling grooves facing the rolling element rolling grooves of the guide rail straddling the guide rail to be capable of moving relatively in the axial direction through rolling of a large number of rolling elements inserted between the rolling element rolling grooves, wherein the linear guide apparatus comprises a side seal unit attached to an axial direction end part of the slider, wherein the side seal unit comprises a first seal member, at the slider side, arranged along the axial direction of the slider, a second seal member at an outside of the slider in the axial direction, and a lubricating member held between the first seal member and the second seal member, wherein the first seal member comprises first lip parts sliding against the rolling element rolling grooves of the guide rail, the second seal member comprises second lip parts sliding against the rolling element rolling grooves of the guide rail, the lubricating member comprises a first oil-containing member for supplying lubricant to the rolling element rolling grooves of the guide rail, wherein the first lip parts and the first oil-containing member are arranged not to come into contact with each other, and the second lip parts and the first oil-containing member are arranged not to come into contact with each other, and wherein the first seal member comprises a first seal plate having the first lip parts and a first holding plate for holding the first seal plate, the second seal member comprises a second seal plate having the second lip parts and a second holding plate for holding the second seal plate, the lubricating member comprises the first oil-containing member and a case for holding the first oil-containing member, the case is used to avoid mutual contact between the first lip parts and the first oil-containing member, and the second holding plate is used to avoid mutual contact between the second lip parts and the first oil-containing member.

2. The linear guide apparatus according to claim 1, wherein an auxiliary side seal is provided between the side seal unit and an axial direction end part of the slider, and the auxiliary side seal comprises third lip parts sliding against the rolling element rolling grooves of the guide rail.

3. The linear guide apparatus according to claim 2, wherein the breakage strength of the third lip parts is smaller than those of the first lip parts, and is smaller than those of the second lip parts.

4. The linear guide apparatus according to claim 2, wherein an auxiliary lubricating member is provided between the auxiliary side seal and an axial direction end part of the slider, and the auxiliary lubricating member comprises a second oil-containing member for supplying lubricant to the rolling element rolling grooves of the guide rail.

5. The linear guide apparatus according to claim 1, wherein an auxiliary side seal is provided between the side seal unit and an axial direction end part of the slider, and the auxiliary side seal comprises third lip parts sliding against the rolling element rolling grooves of the guide rail.

6. The linear guide apparatus according to claim 5, wherein the breakage strength of the third lip parts is smaller than those of the first lip parts, and is smaller than those of the second lip parts.

7. The linear guide apparatus according to claim 6, wherein an auxiliary lubricating member is provided between the auxiliary side seal and an axial direction end part of the slider, and the auxiliary lubricating member comprises a second oil-containing member for supplying lubricant to the rolling element rolling grooves of the guide rail.

8. The linear guide apparatus according to claim 3, wherein an auxiliary lubricating member is provided between the auxiliary side seal and an axial direction end part of the slider, and the auxiliary lubricating member comprises a second oil-containing member for supplying lubricant to the rolling element rolling grooves of the guide rail.

* * * * *